Jan. 27, 1959     A. E. DE MOTT     2,870,701
TOASTER
Filed March 27, 1957     3 Sheets-Sheet 1
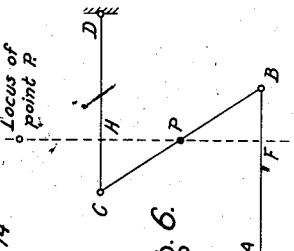
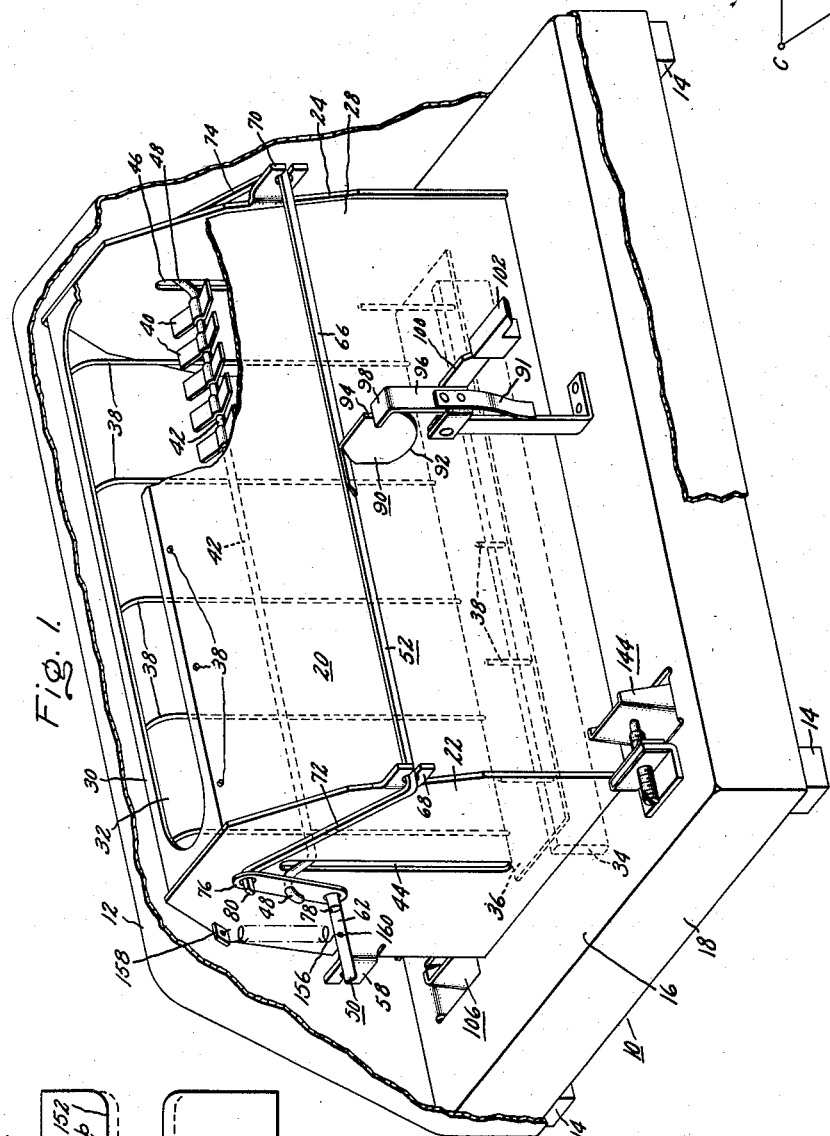
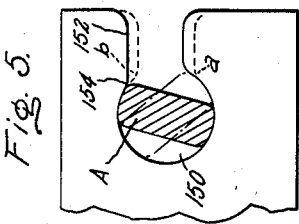
Inventor:
Alfred E. DeMott,
by Armand Cifelli
His Attorney.

Jan. 27, 1959    A. E. DE MOTT    2,870,701
TOASTER
Filed March 27, 1957    3 Sheets-Sheet 2

Inventor:
Alfred E. DeMott,
by Armand Cifelli
His Attorney.

Jan. 27, 1959

A. E. DE MOTT 2,870,701

TOASTER

Filed March 27, 1957

Inventor:
Alfred E. DeMott.
by Armand Cifelli
His Attorney.

United States Patent Office 2,870,701
Patented Jan. 27, 1959

2,870,701
TOASTER

Alfred E. De Mott, Allentown, Pa., assignor to General Electric Company, a corporation of New York Application March 27, 1957, Serial No. 648,902

11 Claims. (Cl. 99—391)

The instant invention relates to toasters, particularly to the means for supporting bread slices or the like for movement between a toasting position and a non-toasting position, and more particularly to such means which include bread rack supporting mechanism in a toaster having a "long" bread rack and/or a "hot wire" bread rack drive. For the purposes of this patent application, a "long" bread rack is one having a length sufficient to simultaneously support at least two normal slices of bread in tandem, and a "hot wire drive" is one which includes an expansible and contractible element, the motion of which causes or allows movement of the bread rack. Whereas an embodiment of the invention will be disclosed which includes both a long bread rack and a hot wire drive, and this is a preferred arrangement, it should be realized that the improved bread rack supporting mechanism is useful combined with either the long bread rack or hot wire drive alone, or without either just by itself, for it comprises an improvement in a toaster generally in and of itself. Also, whereas in the disclosed embodiment, a specific hot wire bread rack drive will be disclosed, it should be realized that other hot wire drives may be substituted, and that all that is necessary for the purposes of this disclosed embodiment is for the drive to have an expansible and contractible element, the motion of which causes or allows movement of the bread rack; the cause of the expansion or contraction is not particularly relevant, nor is the specific direction in which the bread rack moves in response to motion of the element particularly relevant.

In many existing electric toasters, particularly in the vertical, so-called "pop-up" type, there is provided means for supporting bread slices, means for lowering bread slices from an upper, non-toasting position to a lower, toasting position, and means for raising them from the lower, toasting position to the upper, non-toasting position after they have been toasted. These means normally include a bread rack for supporting bread slices, a mechanism for supporting the bread rack for movement between the two extreme positions, a mechanism for lowering the bread rack, and a mechanism for raising the bread rack. In one specific type of prior art toaster, the bread rack is supported by a pantograph linkage arrangement, and is manually lowered by being forced down against a return spring, and allowed to be raised by the return spring at the proper time. Due to the large overhangs and long linkage lengths required, this type of bread rack support is not well suited to support a long bread rack. Other types of bread rack supports have been used in the past, such as those which employ vertical columns on which bushings or the like which are connected to a bread rack are guided. Due to the high frictional forces, high weight factor and the inherent inability of this type of arrangement to multiply small actuating motions, this arrangement does not lend itself for use with a hot wire drive. It is, therefore, apparent that the prior art fails to provide a bread rack supporting means which permits movement of the bread rack between a toasting position and a non-toasting position and which is well suited for use with a long bread rack and/or with a hot wire drive.

It is an object of this invention to provide an improved electric toaster generally, and particularly one which includes an improved bread rack supporting mechanism which is simple in construction, inexpensive to manufacture and reliable in use.

It is a further object of this invention to provide in an electric toaster an improved bread rack supporting mechanism wherein the weight of the mechanism is small, and the pivot loads and frictional forces are low and, therefore, wherein the mechanism is well suited for use with a long bread rack and lends itself readily to use with a hot wire drive.

The objects of this invention are accomplished in one form by the provision in an electric toaster of a bread rack supporting mechanism which incorporates an arrangement of mechanical elements which operates in part in accordance with the principle of Watt's Motion, modified slightly to enhance the operation of the mechanism, and further by the provision of low friction, pivotal bearings for the mechanical elements.

The above and other objects and further details of that which I believed to be novel and my invention will be clear from the following description and claims taken with the accompanying drawings wherein:

Fig. 1 is a perspective view of an electric toaster incorporating the instant invention, showing the outer shell and other portions thereof broken away and shown in section for the purposes of clarity; the bread rack and its supporting mechanism is illustrated in their upper, non-toasting position;

Fig. 5 is a diagrammatic view showing the construction of a pivotal bearing and a mechanical element, and Fig. 6 is a diagram illustrating the geometry of the Watt's Motion principle.

Figure 2:
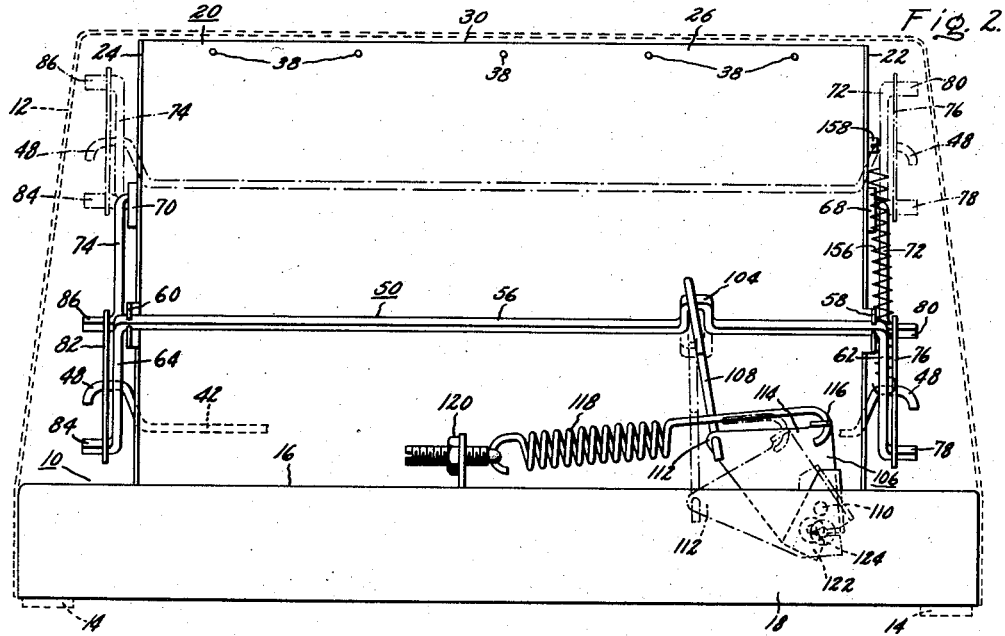
Fig. 2 is an elevation view of the toaster chassis showing one side thereof; the bread rack and its supporting mechanism are illustrated in their upper, non-toasting position in phantom lines, and in their lower, toasting position in solid lines.
Figure 3:
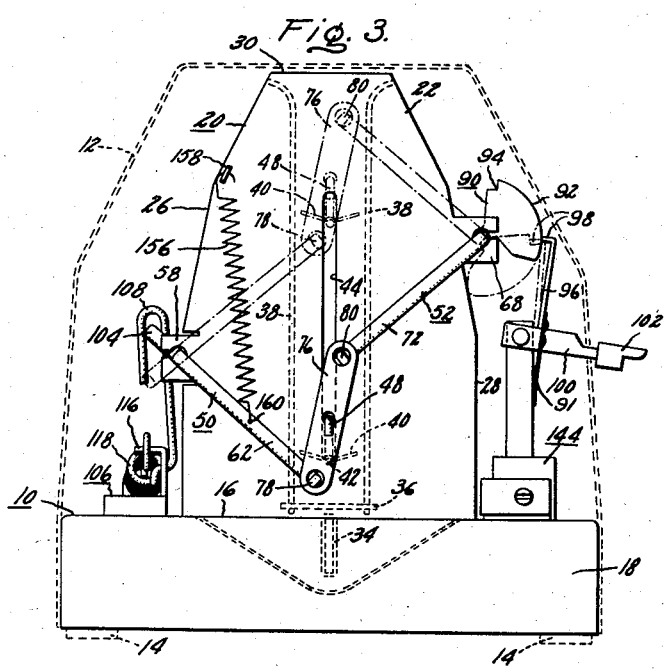
Fig. 3 is an elevation view of the toaster chassis showing one end thereof; the bread rack and its supporting mechanism are illustrated in their two extreme positions in the same manner as in Fig. 2.

Referring to the drawings, the toaster generally comprises the chassis 10 and an outer ornamental shell 12, which may be supported on a surface by a plurality of feet 14. In Figs. 2 and 3 the shell and feet are shown in broken lines. The toaster chassis 10 comprises the horizontal wall 16, which has a vertically depending skirt 18 formed around its periphery, and which supports a toasting chamber 20 on its upper side. The toasting chamber is formed by a pair of end walls 22 and 24, a pair of side walls 26 and 28 and a top wall 30 having an elongated slot 32 of a length greater than the combined width of two conventional slices of bread. The ornamental shell 12 forms no specific part of my invention and, therefore, it is not shown in great detail; however, it does include a slot which corresponds to the slot 32 and which allows access to the interior of the toasting chamber.

Within the toasting chamber there are located bread guiding means and bread toasting means; these means may take various forms. The illustrated arrangement comprises an elongated heating element 34 which extends between the end walls 22 and 24 near the bottom of the toasting chamber. Heating element 34 may comprise an elongated insulated bar having electrical resistance wire wrapped around it, and it may be appropriately wired in the toaster control circuit for energization at the proper time. Extending above and parallel to the heating element 34 is a heat baffle 36 in the form of an elongated metal plate. A plurality of bread guard wires 38 depend from the top wall 30 and are secured in any conventional manner to the heat baffle 36. It will, therefore, be apparent that within the space in the toasting chamber defined generally by the bread guard wires 38, slot 32 and the heat baffle 36, slices of bread or the like may be received for toasting.

It is desirable in a toaster of the type described thus far to provide bread supporting means which will permit bread slices or the like to be disposed in both a toasting position and a non-toasting position in order that they may be placed on said means, moved to toasting position, toasted, then moved to non-toasting position, and removed at will. It is the bread supporting means which the instant invention is principally concerned with. The bread supporting means comprises a bread rack and a bread rack supporting mechanism. The bread rack comprises an elongated, substantially flat plate 40 which may be formed by a plurality of shallow, V-shaped members, as illustrated, and which is disposed for vertical movement in the toasting space in the toasting chamber, and has secured thereto a bread rack rod 42 which extends beyond each end of the bread rack and passes through vertical slots 44 and 46 formed, respectively, in the end walls 22 and 24 (see Fig. 1). The free ends 48 of the bread rack rod 42 are bent upwardly as can best be seen in Figs. 2 and 4.

At each end of the toasting chamber, there are located portions of the bread rack supporting mechanism which are designated control linkage assemblies; each of the control linkage assemblies comprises an arrangement of mechanical elements disposed generally in accordance with the principle of Watt's Motion. The entire bread rack supporting mechanism comprises four members which provide both Watt's Motion control linkage assemblies (see Fig. 4). The bread rack supporting mechanism comprises two generally similar shaped control arms 50 and 52, each of which is generally U-shaped; control arm 50 is designated as the lower control arm, and includes an elongated central portion 56 which is pivotally supported near its ends by the tabs 58 and 60 which are formed on the end walls 22 and 24, respectively, and a pair of control legs 62 and 64 which are generally normal to the central portion 56. The control arm 52 is designated as the upper control arm, and includes a central portion 66 which is pivotally supported near its ends by tabs 68 and 70 which are formed respectively on the end walls 22 and 24, and a pair of control legs 72 and 74 which are generally normal to the central portion 66.

It will be apparent that the control arms 50 and 52 are supported by their associated tabs in such a manner that their central portions are spaced from and parallel to the side walls 26 and 28, respectively, of the toasting chamber, and their control legs reside in general planes which are generally parallel to and spaced from the end walls 22 and 24 of the toasting chamber. The free ends of all of the control legs are bent substantially at right angles away from their associated end walls, and are pivotally received in openings in control links which connect the ends of the control legs; specifically, adjacent to the end wall 22, the control link 76 has a pair of openings, one near each end thereof, which receive the bent free ends 78 and 80 of the control legs 62 and 72, respectively. Adjacent the end wall 24, the control link 82 is disposed and has a pair of openings, one near each its ends, which receive the bent free ends 84 and 86 of the control legs 64 and 74, respectively.

It should, therefore, be apparent that each control linkage assembly comprises a pair of pivotal control legs and a control link. The control links 76 and 82 each have a central opening which pivotally receives one of the bent ends 48 of the bread rack rod 42. With the construction described thus far, it will be apparent that the bread rack 40 is supported on the bread rack rod 42, which in turn has upwardly bent ends 48 which are pivotally received in central openings in the control links 76 and 82, and that the latter are supported by the free bent ends of the control legs 62, 72 and 74, 64, respectively. Further, it will be apparent that the control arms 50 and 52 are pivotally supported in the tabs 58, 60 and 68, 70, respectively, and that pivoting of the control arms results in swinging movement of the control legs and oscillation of the control links in such a manner that the central openings in the control links will describe a substantially vertical path between their lower limit of movement and their upper limit of movement. The limits of movement are illustrated in Figs. 2 and 3, wherein the upper limit of movement of the control links and, therefore, of the bread rack and its rod is illustrated in phantom lines and the lower limit is illustrated in solid lines. It should, therefore, be apparent that by moving one or both of the control arms 50 and 52, movement of the mechanical elements of the bread rack supporting mechanism including both control linkage assemblies results, which has the ultimate effect of moving the bread rack vertically up or down.

In view of the fact that each control linkage assembly of the bread rack supporting mechanism functions generally in accordance with the principle of Watt's Motion, it is believed advisable that a brief explanation of this principle be made at this time. By reference to Fig. 6, a diagram illustrating the geometry of the principle of Watt's Motion will be observed. The linkage illustrated in Fig. 6 is a simple three bar linkage wherein two of the links (AB and CD) are pivoted to fixed points (A and D, respectively) and connected at their free ends by a coupler (CB). The geometry of this system is such that the locus of the point P on the coupler describes approximately a straight vertical line between certain limits of motion of the system. If the pivoted links AB and CD are equal in length, then the point P will be located centrally of the coupler CB. The geometrical formulae that will give the locus of point P the best approximation to a straight line if $AB=CD$ are as follows:

$$AB=CD=AF+\frac{S^2}{16AF}$$

$$BC=\sqrt{\frac{S^2}{4}+\frac{S^4}{16AF^2}}$$

$$FH=S/2$$

where S is the vertical distance that point P moves through.

It will, therefore, be apparent that if control legs and control links at each end of the toasting chamber are designed to correspond to the links of a Watt's Motion system as illustrated in Fig. 6, that pivoting of the control legs results in oscillatory movement of the control link with the resultant movement of the center of the control link being in a substantially vertical, straight line.

The bread rack supporting mechanism just described which is based in part on the principle of Watt's Motion comprises a highly efficient, economical arrangement for supporting a vertically movable bread rack in any type of toaster. It should be observed that the entire mechanical structure for supporting the bread rack comprises four elements, two control arms and two control links. Notwithstanding its simplicity, the bread rack supporting mechanism is particularly well suited for incorporation in a toaster wherein a long bread rack is employed, for in such an environment, previously utilized, bread rack supporting means have been found ineffective because of unwieldly linkages and large overhangs. It is also useful in a toaster wherein a hot wire bread rack driving mechanism is employed. It is in a toaster which incorporates either or both a long bread rack and a hot wire bread rack driving mechanism that the instant bread rack supporting mechanism is particularly well suited.

In the drawings there is illustrated an arrangement for driving the bread rack, which is of the hot wire type. The particular bread rack driving mechanism illustrated is not my invention alone, but an independent invention of Messrs. P. M. Kropp, Jr., and W. A. Schmall and myself jointly, and it is described and claimed in copending patent application, Serial No. 648,901 (6D-442), filed concurrently herewith and assigned to the assignee of the instant application.

The bread rack driving mechanism illustrated is particularly effective when utilized with the described bread rack supporting mechanism, because of the fact that the bread rack supporting mechanism is extremely light in weight and includes a minimum of frictional resistance. It should be clearly understood, however, that the bread rack supporting mechanism may be utilized with bread rack driving mechanisms, other than the illustrated one, and that it is particularly adapted for use with bread rack driving mechanisms that include an expansible and contractible actuating element because it is light, relatively frictionless and is capable of multiplying small activating motions. It should be further understood that the bread rack driving mechanism may drive the bread rack either down or up, or both up and down.

Figure 4:
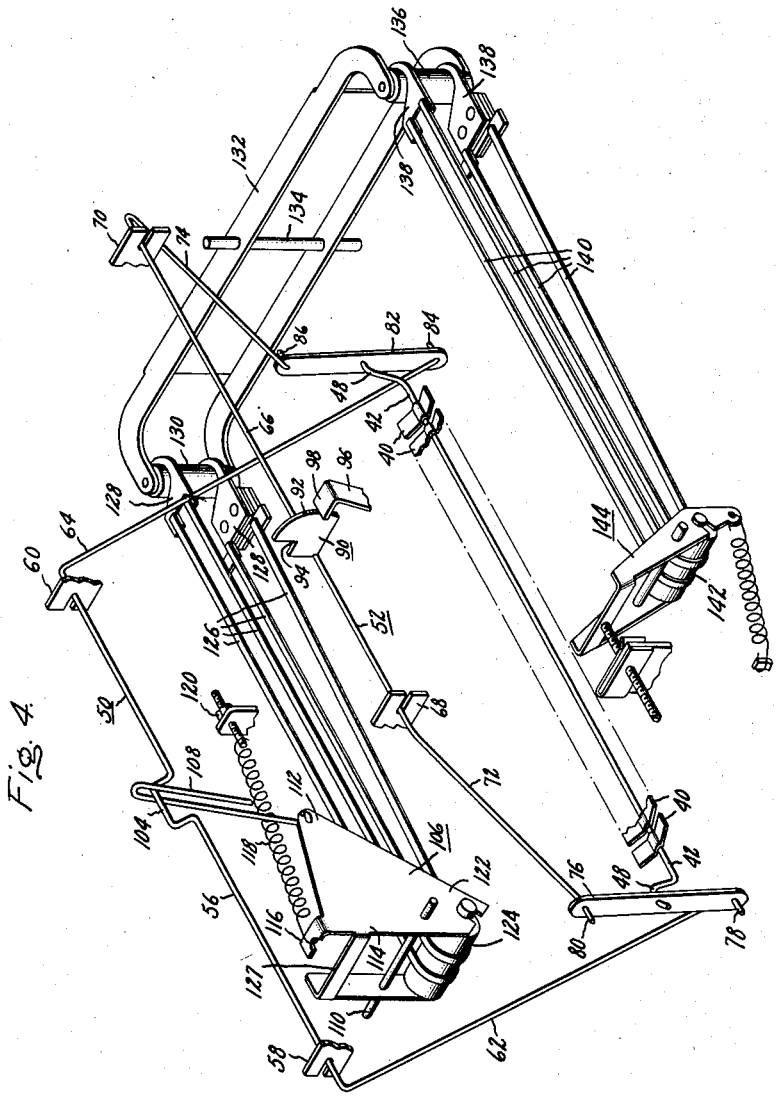
Fig. 4 is a perspective view of a bread rack driving mechanism, the improved bread rack supporting mechanism and some associated toaster parts; the bread rack is illustrated in its lower, toasting position.

In the illustrated toaster, the bread rack 40 is moved from its upper, non-cooking position, illustrated in phantom lines in Figs. 2 and 3, and in solid lines in Fig. 1, to its lower, cooking position, illustrated in solid lines in Figs. 2, 3 and 4, by the force of gravity. Therefore, in order to cause the bread rack to move to its lower position, it is solely necessary to allow the force of gravity to become operative on the bread rack, as by unlatching the bread rack supporting mechanism. It should be recognized, however, that other means for causing the bread rack to be moved to its lower position could be employed.

In the illustrated embodiment, unlatching of the bread rack supporting mechanism is accomplished by the provision of a segmental latch 90 which is rigidly secured to the central portion 66 of the control arm 52. The latch 90 has a smooth arcuate edge 92 and a notch 94 formed at one end of the edge. Disposed adjacent to the latch 90 is the latching arm 96 which is supported at one of its ends and has a latching detent 98 formed at its other end. Latching arm 96 is normally biased in a direction toward the latch 90, and is associated with an unlatching lever 100 which has a knob 102 at its free end. The arrangement of the latch construction is such that the detent 98 is normally urged against the latch 90 by the leaf spring 91.

When the bread rack is in its upper position (see Fig. 3) the detent 98 is located in the notch 94, and the weight of the bread rack and its supporting mechanism is such that it is urged downwardly, but restrained from downward movement by the interference between the latching detent 98 and the portion of the latch 90 around the notch 94. To lower the bread rack, the latching detent 98 is moved out of the notch 94 (to the right as viewed in Fig. 3) by depressing the knob 102 which through the linkage of the latching lever 100 and latching arm 96 effectuates the desired movement of the latching detent 98. When the latching detent clears the arcuate edge 92, the bread rack moves downwardly and causes the control arms to pivot in their supporting tabs resulting in movement of the control legs and control links from their phantom line position to their full line position in Figs. 2 and 3. The latch 90 also moves from its phantom line position to its solid line position as viewed in Fig. 3.

When the bread rack reaches its lowermost position the bread slices are in toasting position and appropriate mechanism in the toaster may energize the heating element 34 which radiates heat energy that is reflected off the internal surfaces of the walls which form the toasting chamber and toasts the bread. An appropriate timing mechanism may be included in the toaster to de-energize the heating unit 34 after the bread is toasted, and actuate a bread rack driving means to return the bread rack to its upper position. The illustrated bread rack driving mechanism, which will subsequently be described in detail, operates to raise the bread rack 40 from its lower position to its upper position, by moving the crank 104, which is formed in the central portion 56 of the control arm 50, downwardly. The downward movement of the crank 104 results in both of the control arms 50 and 52 being pivoted in their supporting tabs, and the control links 76 and 82 being moved upwardly; the overall effect of this movement is to cause the bread rack 40 to be raised from its lower position to its upper position. When the bread rack reaches its upper position, the latching detent enters the notch 94 and the bread rack is latched in its upper position. Although the illustrated bread rack driving means is of the hot wire type, and is very effective when used with the improved bread rack supporting mechanism, it should be recognized that other bread rack driving mechanisms could be employed.

The bread rack driving mechanism is illustrated in association with the bread supporting means removed from the remaining toaster structure in Fig. 4. The principal portions of the bread rack driving mechanism are located below the horizontal wall 16 and within the skirt 18; for clarity, the wall and skirt have not been illustrated in Fig. 4. As was previously mentioned, the detailed construction of the bread rack driving mechanism may be that disclosed and claimed in the copending application of Messrs. Kropp, Schmall and myself. For purposes of this application, the bread rack driving mechanism will be explained generally, and only sufficiently to insure an understanding of one particular application of the bread supporting means, which is the principal aspect of my invention.

The bread rack driving mechanism illustrated comprises the bell crank 106, the bell crank link 108, which operatively connects the bell crank to the crank 104, and the associated parts for causing movement of the bell crank in a desired manner to lower the bell crank link 108 at the proper time to thereby lower the crank 104 and actuate the bread rack supporting mechanism to raise the bread rack to its upper position. The bell crank 106 is pivotally secured to one side of the toaster chassis on a pivot pin 110. The bell crank has a generally triangular configuration, and is pivoted on an axis which falls generally between two corners of the triangle. One corner 112 of the triangle pivotally supports one end of the bell crank link 108; another corner 114 has a tab 116 which supports one end of a coil spring 118, the other end of which is rigidly, but adjustably, secured to the toaster chassis by a threaded rod and nut assembly 120. The last corner 122 of the triangle supports a transverse stub shaft 124, around which are wound metal ribbons 126. The free ends of the ribbons 126 are secured to hook-like connectors 128, which in turn operatively engage a vertically oriented stub shaft 130, which is supported by one side of a yoke assembly 132. The yoke assembly is supported on the pin 134 for pivotal movement about a vertical axis. The other side of the yoke assembly 132 supports a vertically oriented stub shaft 136, which in turn operatively engages hook-like connectors 138, which are secured to the free ends of a second set of metal ribbons 140, which are supported about the transverse stub shaft 142, which in turn is supported on an adjustable bracket assembly 144.

The bread rack driving mechanism just described operates at the appropriate time to lower the bell crank link 108 in the following manner. At the time during a toasting operation when the bread rack has been moved to its lower position, the bread has been toasted and the heating element has been de-energized, the condition of the bread rack driving mechanism is as follows: the metal ribbons 126 and 140 are relatively cold and taut, in fact, they are in tension, which is caused by the relatively powerful coil spring 118, which is stressed, acting through the bell crank. The disposition of the parts is as illustrated in Fig. 4, and at the appropriate time, i. e., when it is desired to raise the bread rack, the metal ribbons 126 and 140 are allowed to expand in response to being heated. The heating may be the result of the metal ribbons having current sent through them as is the case in the copending patent application of Messrs. Schmall and Kropp and myself. Regardless of whether the ribbons 126 and 140 are directly or indirectly heated, the desired result is to cause them to expand at the proper time. The expansion of each set of ribbons 126 and 140 is added by the yoke assembly, and results in allowing the coil spring 118 to contract, thereby pivoting the bell crank, clockwise as viewed in Fig. 4, and counterclockwise, as viewed in Fig. 2. Such movement has the effect of causing the corner 112 of the bell crank to move downwardly and to thereby move the bell crank link 108 and the crank 104 downwardly (see phantom line position of these parts in Fig. 2). This causes the bread rack supporting mechanism to be actuated to raise the bread rack by pivoting the control arm 50 and, hence, the entire bread rack supporting mechanism functions to raise the bread rack.

When the bread rack reaches its upper position, it is latched and the bread rack driving mechanism is de-energized and allowed to cool and resume its original position. When this occurs, the bell crank link 108 is moved upwardly (solid line position in Figs. 2 and 3) but because of the lost motion connection between it and the crank 104, no effect on the bread rack or its supporting mechanism is made; the bell crank link 108 is simply poised and ready to operatively engage the crank 104 when the bread rack is subsequently lowered, in anticipation of thereafter lowering the bell crank 104 to actuate the bread rack supporting mechanism and raise the bread rack at the proper time.

In practice it was found that a toaster constructed in accordance with the foregoing disclosure, possessed two operational defects which had to be overcome before an efficiently operating toaster was achieved. The first defect centered about the limited lifting capacity of a bread rack driving mechanism of the type disclosed. When the bread rack is in its lower position, the maximum lifting force is necessitated in order to overcome initial starting friction and to be able to tear bread loose that may have been burned fast to the bread guards. With a bread rack supporting mechanism designed strictly in accordance with the formulae pertaining to the principle of Watt's Motion, it was found that in driving from the lower control arm, much of the lifting capacity of the bread rack driving mechanism was dissipated in placing the upper control arm in compression, because the angle between it and the control link was close to 180°. To alleviate this problem, the dimensional relationship of the control legs and control links was adjusted by increasing the length of the control legs and decreasing the length of the control links. By deviating from the formulae of Watt's Motion, some slight deviation from straight line motion of the central openings in the control links resulted. However, the deviation was slight and does not materially affect the operation of the bread rack.

To generally facilitate the operation of the break rack supporting mechanism and to further increase the lifting capacity of the driving means, the counterbalance spring 156 may be employed. If it is used, one end of the counterbalance spring is secured to the tab 158 formed on the end wall 22, and the other end of the counterbalance spring is secured in an opening 160 in the control leg 62. When the bread rack is in its upper position, the counterbalance spring, which is in the form of a coil, is in its unstressed condition. When the bread rack is lowered, the counterbalance spring resists such movement, hence, is stressed; when the bread rack is in its lower position, the counterbalance spring biases the control leg 62 upwardly. When the bread rack driving mechanism operates to raise the bread rack, the counterbalance spring assists in lifting the control leg 62 upwardly. It should, therefore, be apparent that the counterbalance spring operates to dampen the drop of the bread rack when the latter is unlatched and allowed to fall from its upper position to its lower position, and that the counterbalance spring assists the bread rack driving mechanism in raising the bread rack from its lower position to its upper position. From the foregoing, it should be apparent that use of the counterbalance spring is optional, and that it may be omitted, if desired.

The second operational defect involves the specific configuration of the pivot bearings in the control arm supporting tabs, and the cross-sectional configuration of the control arms. The construction illustrated in Fig. 5 was ultimately arrived at as being most effective. Each of the tabs has a circular opening 150 formed therein and a horizontally disposed slot 152 which extends between the opening 150 and the side edge of tab. It should be noted that slot 152 does not intersect the opening 150 centrally, but has its center line located above the center of the opening. In Fig. 5, a hypothetical slot is dotted in to illustrate the location of a slot that intersects the opening 152 centrally. In practice it was found that if the slot were located in this manner, several operational difficulties resulted. For example, the control arm A in pivoting from its solid line position to its phantom line position during operation of the toaster, occasionally slipped over the corner "a" and became jammed when moved in the reverse direction. It was also found that when the control arm was rotating clockwise, and reached the solid line position, it would tend to pivot about its lower edge rather than rotate about its cross-sectional axis; this resulted frequently in the control arm becoming bound tightly against the corner "b." To eliminate both difficulties, the slot is actually located as indicated in solid lines in Fig. 5, and the corner 154, which defines in part the slot 152, has been relieved. It should be understood that the foregoing description of one tab and control bar applies to each of the tab and control bar bearings. It should be further noted that the control bar is not rectangular in cross-section, but elliptical or rectangular with the edges rounded off, as illustrated, to facilitate rotation of the control bars in the tab openings, and to eliminate jamming or binding.

In view of the foregoing, it is believed that the construction and operation of the improved toaster is clear. The salient advantages of the improved bread rack supporting mechanism are as follows: (1) simplicity: (A) to manufacture, (a) it has a small number of parts and several are interchangeable, and (b) there are no precision shoulder rivets necessary, as is the case in many prior art constructions; (B) to assemble, (a) can be assembled without fasteners for it is solely necessary to locate the control arms in the supporting tabs, locate the control links on the bent ends of the bread rack rod, and then force the bent ends of the control legs into the openings in the ends of the control links, and (b) jigging is not required; (2) The bearings between the control arms and the tabs can be sloppy, thereby eliminating the possibility of binding; (3) Pivot loads are low compared to other types of bread rack supporting mechanisms; (4) Frictional forces are low relative to other types of bread rack supporting mechanisms; (5) It lends itself readily and effectively to multiplying the motion of a hot wire driving mechanism. In practice it was found that a multiplication of five to one of the motion of the driving mechanism was effected; (6) The weight of the bread rack and its supporting mechanism is small and hence, the work that has to be done by the driving mechanism is minimized; (7) Elongated bread racks may be effectively supported; and (8) Because of the general simplicity of the structure and assembly, the absence of expensive screw machine parts and the elimination of jigs, the cost of manufacture is relatively low.

As will be evident from the foregoing description, certain aspects of my invention are not limited to the particular details of construction of the example illustrated, and I contemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. In a toaster having a toasting chamber, means for holding food to be toasted, and means for toasting said food, the improvement comprising: mechanism for supporting said holding means in either a toasting position or a non-toasting position, said supporting mechanism comprising a pair of control linkage assemblies, one of said control linkage assemblies being located adjacent each end of said holding means, each of said control linkage assemblies comprising a pair of control legs and a control link which are generally disposed in a common plane, said control legs being elongated and each being pivotally secured at one of its ends about a fixed point, said points being spaced, the other ends of the control legs of each assembly being pivotally secured to the ends of their associated control link, the parts of each control linkage assembly being disposed substantially in accordance with the principle of Watt's Motion, and said control links being secured to the ends of said holding means, whereby pivotal movement of said control legs results in substantially straight line movement of said holding means between said positions.

2. A device as defined in claim 1 wherein the Watt's Motion disposition of each of said control linkage assemblies is modified by the provision that said control legs are longer and said control links are shorter than the corresponding elements in a control linkage assembly designed strictly in accordance with the formulae pertaining to the principle of Watt's Motion.

3. A device as defined in claim 1 wherein both of said control linkage assemblies are formed by a pair of generally U-shaped control arms and a pair of control links.

4. A toaster comprising: a toasting chamber having side and end walls; a vertically movable, elongated rack in said chamber for supporting food to be toasted and accessible from the exterior of said toaster; means for supporting said rack in an upper non-toasting position and a lower toasting position; means for causing said rack to move to its lower position; means for toasting said food when it is in said lower position; and means for driving said rack supporting means to raise said rack to its upper position after said food is toasted; said rack supporting means comprising a pair of control linkage assemblies, one of said assemblies being disposed adjacent each end wall of said toaster chamber and comprising a pair of control legs and a control link, said control legs being elongated and each being pivotally secured at one of its ends about a fixed point, said points being spaced, one above the other, at each end of the toasting chamber, the other ends of said control legs in each assembly being pivotally secured to the ends of the control link associated with them, the parts of each assembly being disposed in a common plane substantially in accordance with the principle of Watt's Motion, and said control links supporting said rack near its ends.

5. A device as defined in claim 4 wherein said driving means includes an expansible and contractible element which results in a predetermined amount of movement of a portion of said driving means, and said rack supporting means is operatively associated with said driving means so as to multiply the motion of said portion to raise said rack.

6. A device as defined in claim 5 wherein said portion has a lost motion connection with a crank that operates said assemblies to raise said rack, and said portion and crank are in driving relationship when the rack is in its lower position.

7. A device as defined in claim 4 wherein said control linkage assemblies are formed by a pair of generally U-shaped control arms and a pair of control links, whereby the legs of said arms comprise said control legs.

8. A device as defined in claim 7 wherein said pivotally secured ends of said control legs comprise portions of said control arms that are slidably received in apertured tabs, said portions being generally rectangular with rounded edges in cross-section, and said apertures are generally round and communicate with horizontal slots whose horizontal center lines are disposed above the centers of said apertures, whereby the supporting mechanism may readily be formed by sliding said portions through said slots into said apertures and then connecting the control legs to the control links, the arrangement being such that when the supporting mechanism is fully assembled, said portions are slidably mounted and trapped in their associated apertures.

9. A device as defined in claim 4 wherein a counterbalance spring is secured at one of its ends to one of said control legs and at its other end to a fixed point on the toaster; and said counterbalance spring is unstressed when said rack is in its upper position and stressed when said rack is in its lower position, whereby said counterbalance spring dampens the fall of said rack when the latter moves to its lower position, and assists in raising said rack when the latter is raised to its upper position.

10. A device as defined in claim 4 wherein said control linkage assemblies are formed by a pair of generally U-shaped control arms and a pair of control links, whereby the legs of said arms comprise said control legs, and wherein a crank is formed on one of said control arms, said crank being operatively associated with said driving means and cooperating with the latter to raise said rack.

11. A device as defined in claim 4 wherein said means for causing said rack to move to its lower position includes a latch which operates when unlatched to allow said rack to fall by gravity to its lower position.

References Cited in the file of this patent

UNITED STATES PATENTS

| | | |
|---|---|---|
| 2,132,622 | Ireland | Oct. 11, 1938 |
| 2,271,485 | Koci #1 | Jan. 27, 1942 |
| 2,362,753 | Huck | Nov. 14, 1944 |
| 2,624,269 | Hild | Jan. 6, 1953 |
| 2,667,828 | Koci #2 | Feb. 2, 1954 |
| 2,692,549 | Olson | Oct. 26, 1954 |
| 2,750,876 | Visos | June 19, 1956 |